United States Patent
Lancashire et al.

(10) Patent No.: US 7,705,766 B2
(45) Date of Patent: Apr. 27, 2010

(54) SYNTHETIC APERTURE RADAR (75) Inventors: David Charles Lancashire, Havant (GB); Charles David Hall, Emsworth (GB)

(73) Assignee: Astrium Limited, Hertfordshire (GB)

( * ) Notice: Subject to any disclaimer, the term of this patent is extended or adjusted under 35 U.S.C. 154(b) by 418 days.

(21) Appl. No.: 11/662,520

(22) PCT Filed: Nov. 15, 2006

(86) PCT No.: PCT/GB2006/050390

§ 371 (c)(1),
(2), (4) Date: Mar. 12, 2007

(87) PCT Pub. No.: WO2007/057707

PCT Pub. Date: May 24, 2007

(65) Prior Publication Data

US 2009/0051587 A1 Feb. 26, 2009

(30) Foreign Application Priority Data

Nov. 16, 2005 (EP) ................... 05257074
Nov. 16, 2005 (GB) ................... 0523352.3

(51) Int. Cl.
*G01S 13/00* (2006.01)
*G01S 13/08* (2006.01)

(52) U.S. Cl. ............... 342/25 F; 342/25 R; 342/25 A; 342/134; 342/137; 342/159; 342/202

(58) Field of Classification Search .............. 342/25, 342/128, 134, 137, 159, 162, 175, 192, 202, 342/25 R, 25 A, 25 F
See application file for complete search history.

(56) References Cited

U.S. PATENT DOCUMENTS

| 4,106,019 A | * | 8/1978 | Alexander et al. ......... 342/108 |
| 4,593,286 A | * | 6/1986 | Mathews et al. .............. 342/88 |
| 4,706,088 A | * | 11/1987 | Weindling ................ 342/25 A |
| 4,746,922 A | * | 5/1988 | Prenat .......................... 342/88 |
| 5,051,749 A | * | 9/1991 | Stoyle ....................... 342/25 A |
| 5,122,803 A | * | 6/1992 | Stann et al. ............... 342/25 B |
| 5,307,070 A | * | 4/1994 | Runge et al. .............. 342/25 D |
| 5,745,069 A | * | 4/1998 | Gail ......................... 342/25 F |

(Continued)

FOREIGN PATENT DOCUMENTS

DE   195 21 624 A1   12/1995

(Continued)

OTHER PUBLICATIONS

International Search Report.

(Continued)

*Primary Examiner*—Thomas H Tarcza
*Assistant Examiner*—Peter M Bythrow
(74) *Attorney, Agent, or Firm*—Buchanan Ingersoll & Rooney PC (57) ABSTRACT

A method of operating synthetic aperture radar in a low PRF mode, comprising generating a stream of radar pulses, imposing onto said stream a predetermined modulation of the Pulse Repetition Frequency (PRF), directing said stream to a target area, and processing received pulses, comprising separating the received pulses as a sequence of sets, and superposing received radar pulses of said sets, whereby to enhance the central received lobe and to attenuate side lobes.

19 Claims, 13 Drawing Sheets

U.S. PATENT DOCUMENTS

| | | | |
|---|---|---|---|
| 5,847,677 A * | 12/1998 | McCorkle | 342/204 |
| 6,633,253 B2 * | 10/2003 | Cataldo | 342/25 R |
| 7,196,653 B2 * | 3/2007 | Hall et al. | 342/25 F |
| 2004/0150547 A1 * | 8/2004 | Suess et al. | 342/25 A |
| 2005/0104763 A1 * | 5/2005 | Hall et al. | 342/25 A |

FOREIGN PATENT DOCUMENTS

| | | |
|---|---|---|
| EP | 0 389 111 A2 | 9/1990 |
| EP | 0 251 498 A2 | 1/1998 |
| JP | 61-35382 A | 2/1986 |

OTHER PUBLICATIONS

Li F K et al: "Ambiguities in Spaceborne synthetic aperture radar systems" IEEE Transactions on Aerospace and Electronic Systems USA, vol. 19, No. 3, May 1983; pp. 389-397, XP002367064 ISSN: 0018-9251.

* cited by examiner

SYNTHETIC APERTURE RADAR

The present invention relates to Synthetic Aperture Radar (SAR).

BACKGROUND ART

Figure 1:
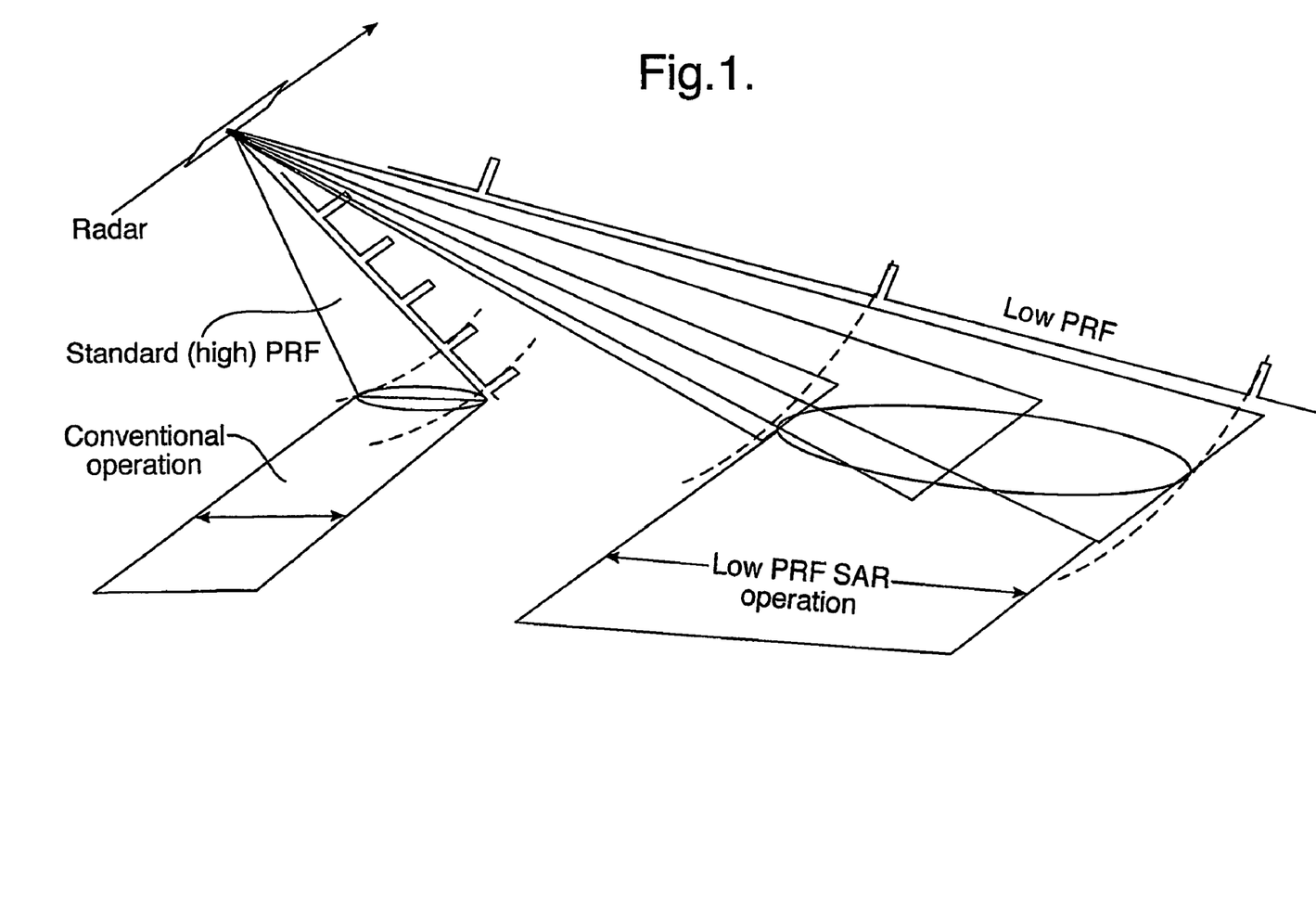
FIG. 1 is a schematic diagram illustrating the concept of low PRF SAR.

A common requirement of SAR is to detect relatively small objects in a generally featureless region, e.g. a ship on the ocean. In this situation, the radar footprint desirably has a wide swath, in the "cross track" direction at right angles to the "along track" direction of the radar platform, so that as large an area as possible is scanned. As will be explained, and as illustrated in FIG. 1, a wide swath requires a low pulse repetition frequency (PRF). Operating a SAR at a low PRF is likely to introduce ambiguities in the along track direction. These are "ghost" images that arise in adjacent lobes and are analogous to the grating lobes seen when monochromatic light is projected through a coarse diffraction grating.

When operating in SAR mode, the radar is usually required to pulse at a high rate (see FIG. 1), namely at a rate sufficiently high that when samples are taken along the trajectory followed by the radar (which is the position of the aperture that will be synthesised), the inevitable grating lobes that exist for sample spacing greater than 1 wavelength are adequately attenuated by the along-track pattern associated with the real aperture propagating pulses from and to the radar. This criterion is the primary driver to the PRF at which the radar must operate. The PRF is a function of the real aperture length (as that length gets shorter, so the real beam widens and has the potential to include more grating lobes so the PRF has to rise in order to introduce more samples and increase the angular spacing between those grating lobes) and the velocity with which the platform moves (low Earth orbiting satellites move at around 7500 m/s). A good working value for the spacing between samples is that this should be somewhat less than half the length of the real aperture.

A consequence of high PRF, is sensitivity to ambiguous returns from the across track direction. All measurements of distance from radar to target are made, modulo the spacing between pulses. So, for unambiguous performance in measuring distance from the radar, the distance between pulses should be greater than the distance on ground/surface that is illuminated by the across-track width of the radar beam. This implies use of a low PRF. However a low PRF then introduces ambiguities in the along track direction.

U.S. Pat. No. 5,745,069 proposes elimination of ambiguity considerations by using a transmitter format providing distinguishable sub-pulses, such as frequency division or code division format. However this is a complex solution requiring increased signal processing overhead and has the potential to introduce blind zones in the image associated with the high PRF pulse transmissions causing saturation in (or avoiding by blanking of) the receive chain.

SUMMARY OF THE INVENTION

It is an object of the invention to provide a synthetic aperture radar that may operate at a low PRF but has a reduced sensitivity to along track azimuth ambiguities.

The concept of the invention is to shift or vary the PRF during echo acquisition from a given location. For example, for each set of pulses at a given PRF, a particular lobe spacing results within the Impulse Response Function (IRF), different from other PRFs. Only the central lobe is coincident from set to set. Thus superposing the different sets of received pulses showing processing results in an enhanced central lobe and attenuated side lobes.

The present invention provides in a first aspect a method of operating synthetic aperture radar in a low PRF mode, comprising generating a stream of radar pulses, imposing onto said stream a predetermined modulation of the Pulse Repetition Frequency (PRF), directing said stream to a target area, and processing received pulses, comprising separating the received pulses as a sequence of sets, and superposing received radar pulses of said sets, whereby to enhance the central received lobe and to attenuate side lobes. In this context, a set will contain one or more pulses.

In a second aspect, the invention provides a synthetic aperture radar for operating in a low PRF mode, comprising means for generating a stream of radar pulses, means for imposing a modulation of the Pulse Repetition Frequency (PRF) of the stream of radar pulses, means for directing said stream to a target area, and means for processing received pulses, including means for separating the received radar pulses into a sequence of sets, and means for superposing received radar signals of the plurality of sets, whereby to enhance the central received lobe and to attenuate side lobes.

For the purposes of this specification, "low PRF" is intended to mean a pulse repetition frequency that is sufficiently low as to introduce significant ambiguity in along track target resolution.

The modulation imposed on the PRF may be of any convenient type. For example it may be achieved by: (1) sets of pulses at different PRFs, (2) pulses whose repetition frequency is adjusted according to a continuous frequency modulation within a relatively small frequency excursion range, (3) pulses whose temporal separation changes according to a pseudo random pattern. The separation of the received radar pulses into a sequence of sets may be carried out in any convenient way. Where the transmitted pulses comprise sets of pulses, each set having a different PRF, then naturally the received pulses will be separated into the same sets. Where the PRF is modulated by a pseudo random sequence, then each set may comprise one repetition of the sequence. Where the pulses are frequency modulated, each set may comprise one "sweep" of the frequency modulation band.

Figure 12:
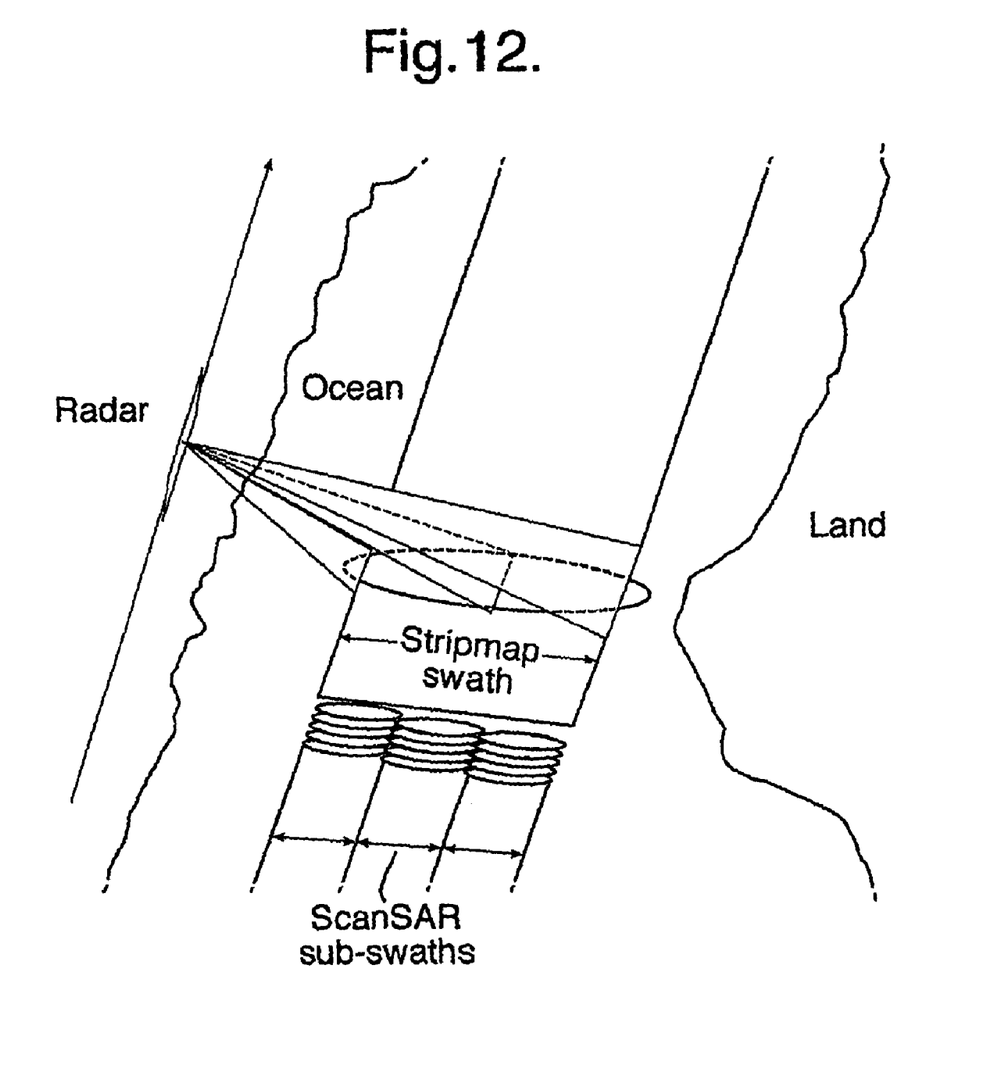
FIG. 12 is a schematic view of different modes of operation in the SAR mode.

The target area at which said stream is directed may be a single wide swath, as in the SAR, mode called STRIPMAP as shown schematically in FIG. 12, in which the footprint of the radar beam remains localised on just one swath, i.e. the near edge of the swath is defined by the near edge of the radar beam footprint and the swath far edge, by the far edge of the radar beam footprint. However, the target area may be smaller in extent, as for example in the radar mode called SCANSAR (FIG. 12), in which the radar beam footprint spends limited periods of time illuminating and receiving from contiguous sub-swaths (as used in the RADASAT-1 satellite and in the ASAR on the ENVISAT satellite.).

Additionally, a sub-mode may be employed that continuously repositions the bore-sight of the receive beam during reception of echoes such that the bore sight always points to that (small) section of the swath from which echoes are instantaneously being received. This sub-mode serves to enhance sensitivity when the radar beam is configured to illuminate wide swath but is not essential to the fundamentals of the invention.

BRIEF DESCRIPTION OF THE DRAWINGS

A preferred embodiment of the invention will now be described with reference to the accompanying drawings, wherein:—

FIG. 5A shows an azimuth IRF with FIG. 5B showing varying levels of integrated clutter;

DESCRIPTION OF THE PREFERRED EMBODIMENT

The case of low PRF mode is unusual in the context of SAR operation, given its acceptance of a highly ambiguous azimuth impulse response function. This leads to the introduction of high levels of clutter signals into target containing resolution cells.

The form of the azimuth impulse response function when operating in this mode is quite different from that associated with what we may helpfully call, 'conventional' SAR operation. Here, during a given observation sequence, the radar operates at the usual high PRF associated with normal SAR modes and the azimuth impulse response function is predominantly a single central lobe surrounded by sidelobes of much smaller magnitude. Grating lobes still occur when operating in these 'conventional' modes, but the magnitudes are small.

Azimuth IRF in Low PRF Mode

Figure 3:
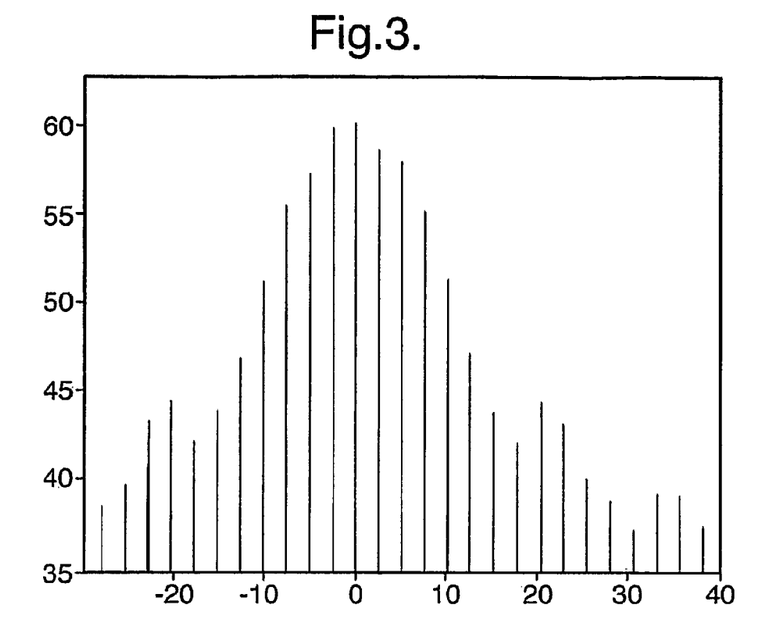
FIG. 3 is a profile of a typical azimuth IRF when operating in a low PRF mode.
Figure 4:
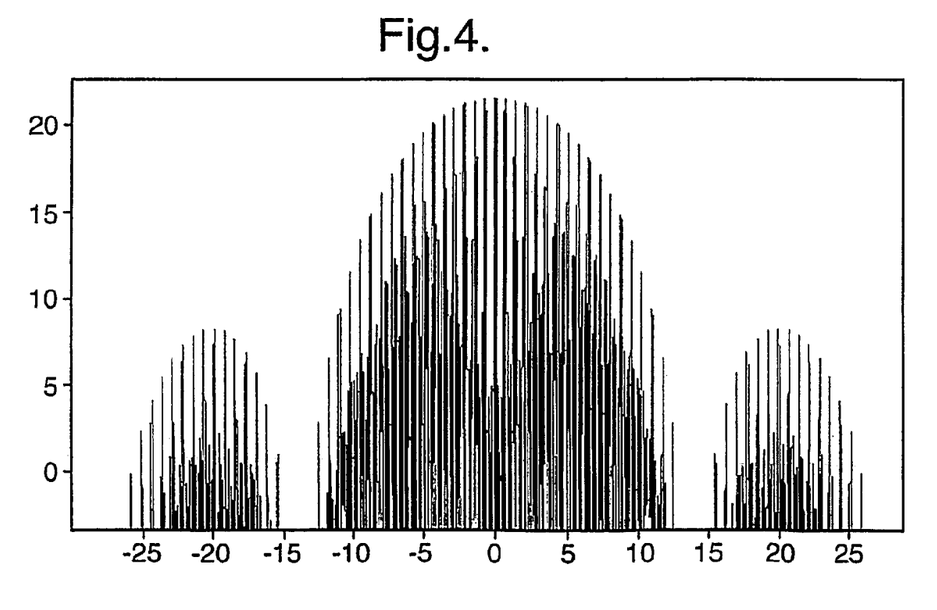
FIG. 4 is a profile of azimuth IRF when operating in accordance with the invention.

The profile of a typical azimuth IRF when operating in low PRF mode is shown in FIG. 3. Within this array of grating lobes, the central lobe is expected to be the target containing lobe. If such a mode were to be used to image conventional scenes such as the land imagery which is frequently collected by SAR systems, then the imagery would appear as an array of images of the scene each displaced from the other by a distance corresponding to the spacing of the lobes in the IRF. The overall result would be a highly confused and virtually useless image.

However, if a low PRF mode is used to image maritime scenes where the principal feature is an ocean populated by a sparse and random distribution of ship targets, then two characteristics can be used to advantage. The background scene against which the targets are imaged is relatively uniform and, particularly at larger incidence angles (far from nadir), the reflectivity of the surface is low so that the clutter contribution is small.

In this situation, as in the land situation, grating lobes in the IRF lead to the superposition of sea reflectances within each background cell. The sea surface detail will still be highly confused so that observation of features like ship-wakes which are close in reflectivity value to that of the sea itself, will be difficult (probably impossible) to detect.

Against this background, where sea reflectance values are small, the resulting signal levels in sea-only resolution cells can still be quite small. Ship targets are likely to be much larger and will stand out as bright features above those of the dim sea surface background. However, just as in the land case, the lobes in the azimuth IRF will cause repeat images of ship targets to appear so that the resulting image will appear as an array of ships displayed in the azimuth direction. The brightness of these repeat images will follow the profile of lobes in the IRF so that in the central region it will be difficult to localise the real target precisely.

Effect of Different PRF Grousing

When observations are made using a fixed PRF, the spacing between adjacent grating lobes of the IRF is well defined and in particular, if many lobes are present, then the envelope of the peaks of those lobes follows closely to the azimuth beam shape. This causes the lobes close to the central part of the beam to be of very similar amplitude as shown in FIG. 3, and makes difficult, isolation of the specific location of a target.

However, if the PRF is shifted during echo acquisition from a given location, for instance into a collection of bursts each of slightly different PRF then the sample spacing along the synthetic aperture changes. For each set of pulses at a given PRF, a particular lobe spacing results within the IRF—but the different contributing PRFs lead to sets of differently spaced lobes in which only the central lobe is coincident from set to set. This causes the central lobe to be emphasised relative to the others. This assists precise target localisation.

Figure 2:
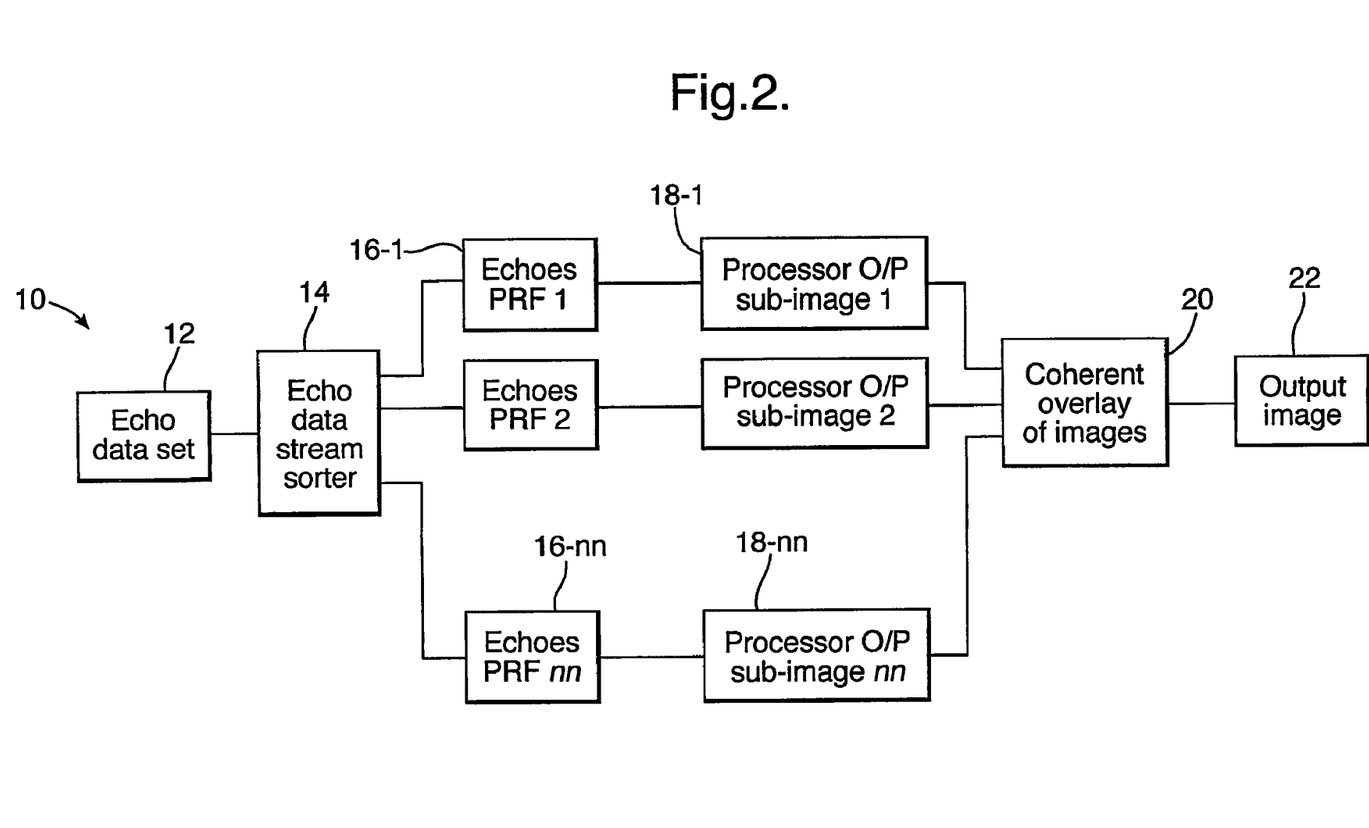
FIG. 2 is a schematic block diagram of a preferred embodiment of the invention.

Referring to FIG. 2, this shows a preferred embodiment of the invention, at least in regard to the receiver section. A stream of radar pulses is transmitted and directed at a selected target area. The stream is divided into sequential sets, each set having a slightly different PRF. The stream is received at the receiver 10, and an echo data set is stored as at 12. The stream is sorted as at 14 into respective sets of different PRF, and each set is stored in a respective memory 16-1 . . . 16-nn. A respective processor 18-1 . . . 18-nn produces a sub-image of the illuminated target area from the respective PRF set. A processor 20 coherently overlays the sub-images, in order to provide a resultant image as at 22.

In an alternative embodiment where the number of pulses in each group is reduced to just one, the interpulse period takes the form of a nominal value upon which is superimposed, a pseudo-random delta time period. In this case, only one of the multiple-PRF processing strings would be implemented.

Impact of IRF Lobes on Clutter IRF

The signal associated with a given resolution cell in the image produced from echo data collected in the low PRF mode is the convolution of the IRF with the scene reflectivity. Thus in the maritime case, when the central lobe sits over a target the rest of the IRF sits over the ocean and many lobes of ocean response contribute to the signal ultimately associated with the central, target-containing lobe. The effect of these additional components is 2-fold, the central cell containing the target is contaminated with unwanted returns, and more importantly, background cells (that do not lie over targets) contain increased levels of clutter. This has the effect of increasing the mean background signal level so that false target occurrences become more common.

Figure 5A:
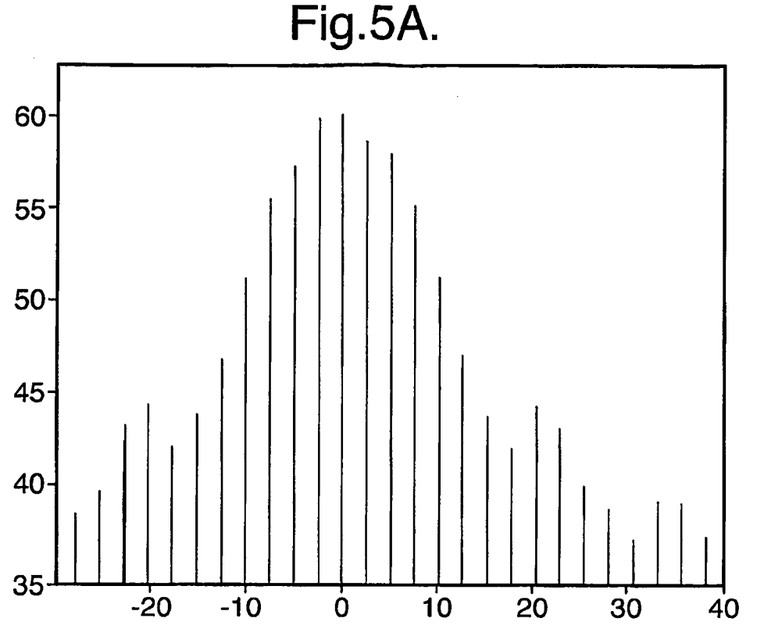
Figure 5B:
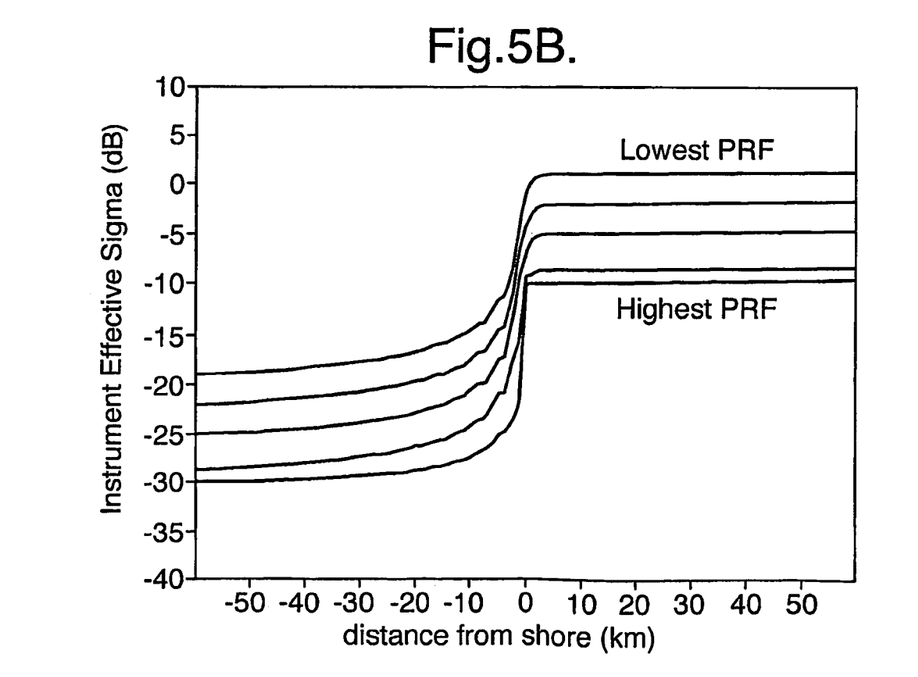

The ratio between central cell and integrated background quantifies the increase in background signal level for background cells compared with that which would have been expected from operation in conventional SAR mode (normal, high PRF). This is shown in FIG. 5 where the integrated response from the low PRF IRF is seen for a range of PRFs changing progressively from the highest PRF to the lowest PRF, as the radar instrument progressively moves from a low reflectivity region (the sea) to a high reflectivity region (the land).

In order to achieve adequate sensitivity to detect targets as above, the system will be sensitive to:
a. thermal/instrument noise:
b. clutter.

Clutter is a key issue in this case. The radar operates using coherent processing to enhance and localise target returns. However, the azimuth impulse response function (IRF) is in conventional SAR image terms, dreadful. It is highly ambiguous and consists of many grating lobes.

Sample separation, a, along the trajectory is set by the PRF $$a = \frac{v_{satellite}}{PRF}$$

Thus we see that for a particular altitude where $v_{sat}$ is 7597 m/s, sample spacing is 31.7 m. With the antenna described in this initial case (length 4 m height 1.2 m), we would expect to operate with sample spacing somewhat smaller than 2 m in order to render ourselves immune to azimuth grating lobes.

EXAMPLE

| Input conditions to simulations | |
| --- | --- |
| Ground sample spacing; | 1.0 m |
| Radar range to target: | 1800 km |
| Wavelength: | 0.0311 m |
| IRF spatial extent: | ±30 km from centre |
| Number of PRF steps: | 4 |
| PRF increment per step: | 1% |
| Goal Azimuth spatial resolution: | 40 m |

Figure 6A:
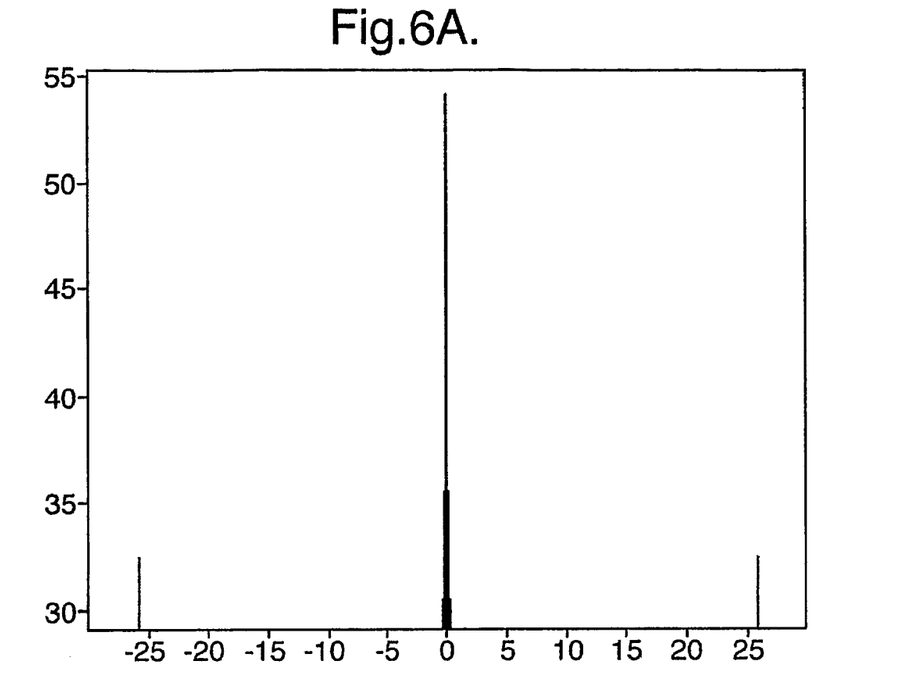
FIGS. 6A and 6B show results from an example of the invention with PRF=7000 Hz.
Figure 6B:
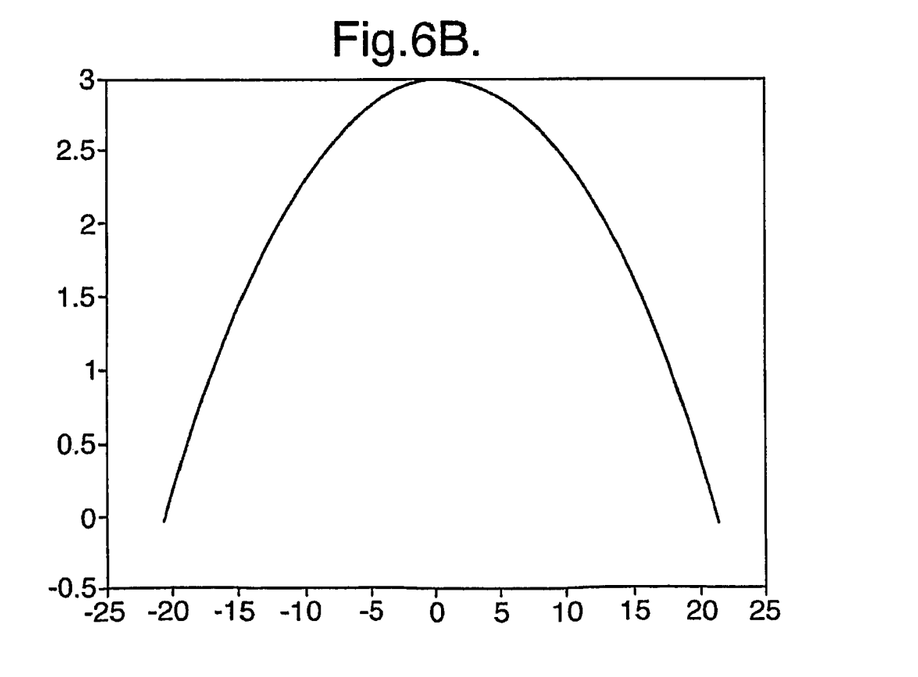
Figure 10A:
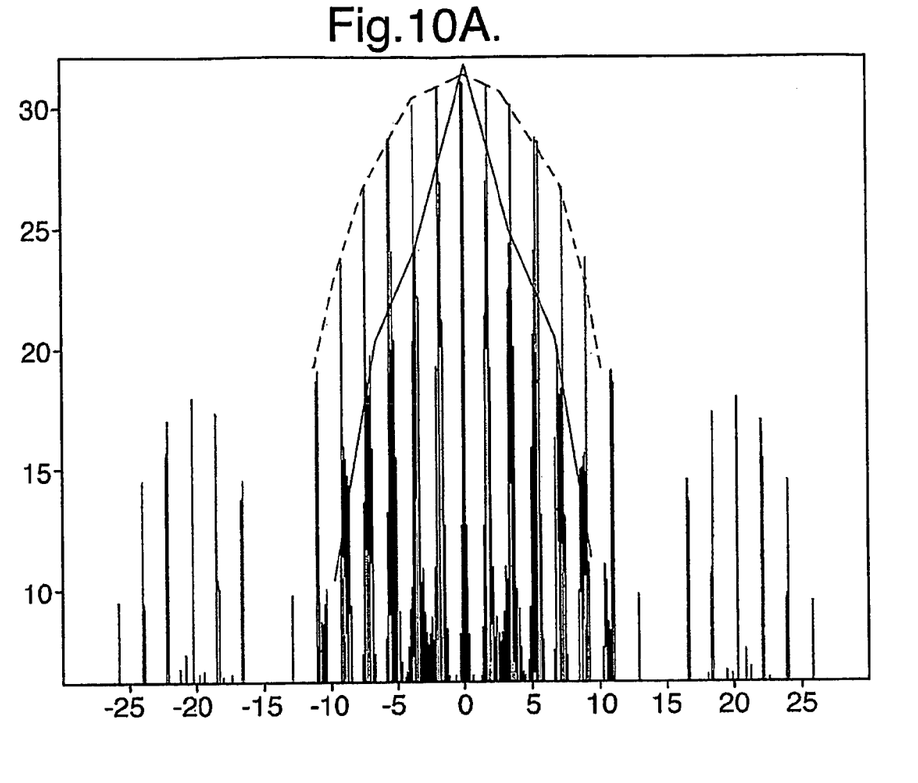
FIGS. 10A and 10B show results from the example with PRF=500 Hz.
Figure 10B:
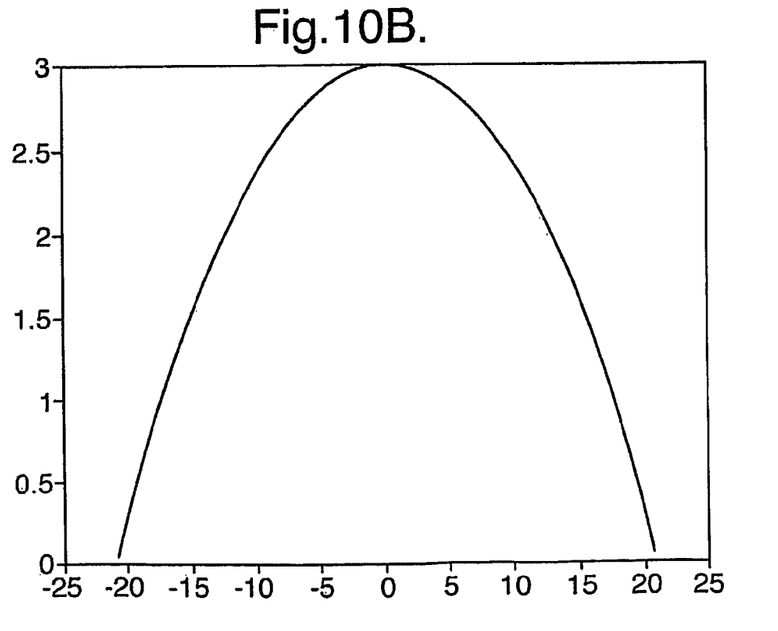
Figure 11A:
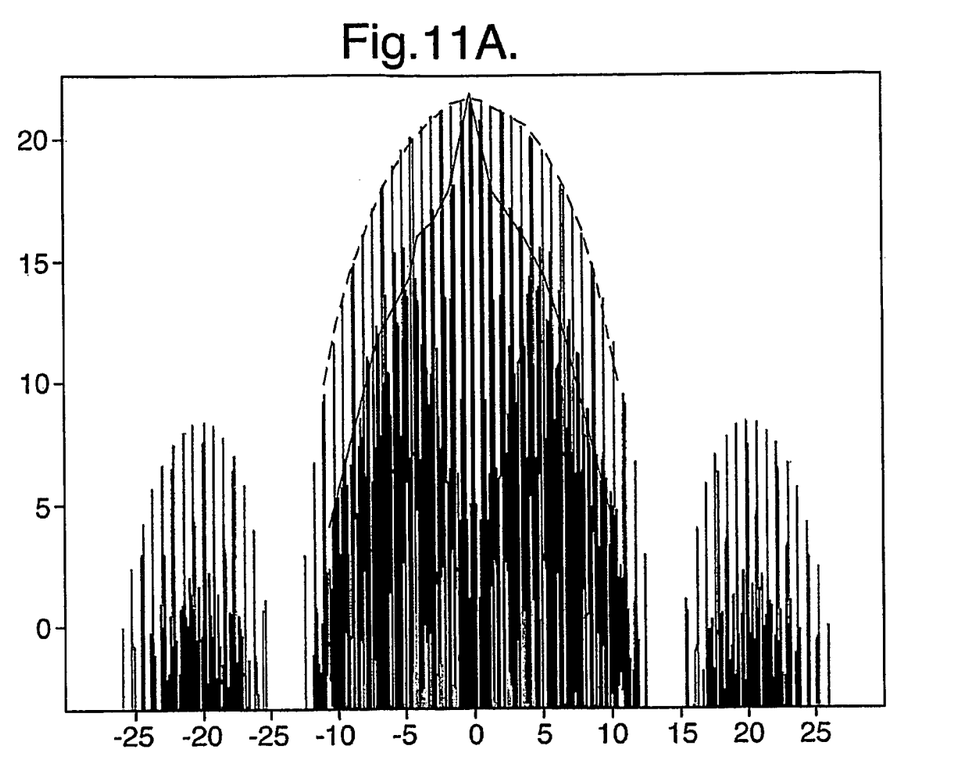
FIGS. 11A and 11B show results from the example with PRF=200 Hz.
Figure 11B:
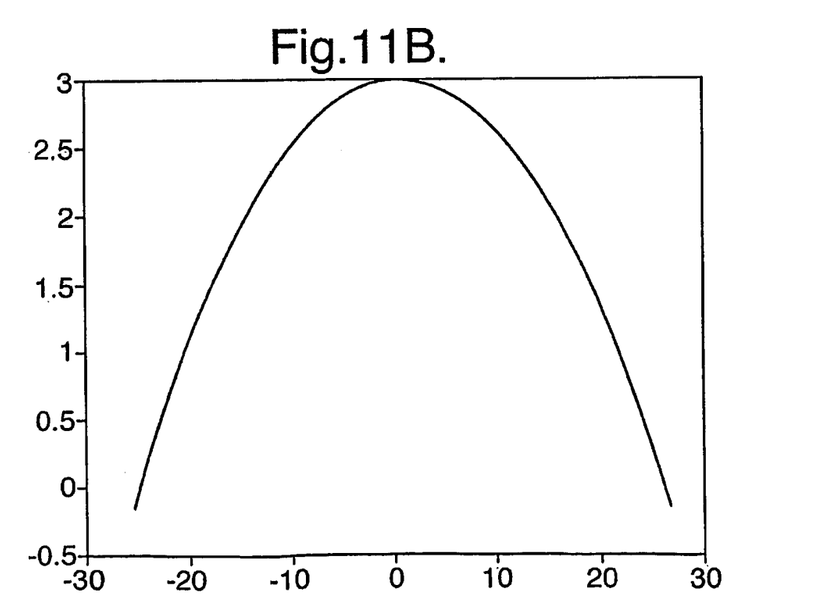

Each of the diagrams from 6 to 11 shows the form of the IRF achieved at a different PRF, starting in FIG. 6 at a high PRF where ambiguity levels are very small and progressing through various smaller PRFs to the lowest PRF (in FIG. 11). Each figure shows the overall shape of the IRF (identified in the diagrams as Figure nn A, displaying the progressively increasing number of major lobes, while the other part of (identified as Figure nnB) demonstrates that the shape of the central lobe, which defines the spatial resolution, does not alter as the PRF changes. Finally, each of the overall shapes of IRF data contains two profiles. These are not readily visible in black and white, but are highlighted by additional constructs in the diagrams where a dashed line has been drawn to indicate the outer, fixed PRF envelope, and a full line, to indicate the inner, more rapidly decaying IRF associated with the stepped PRF operation.

Figure 7A:
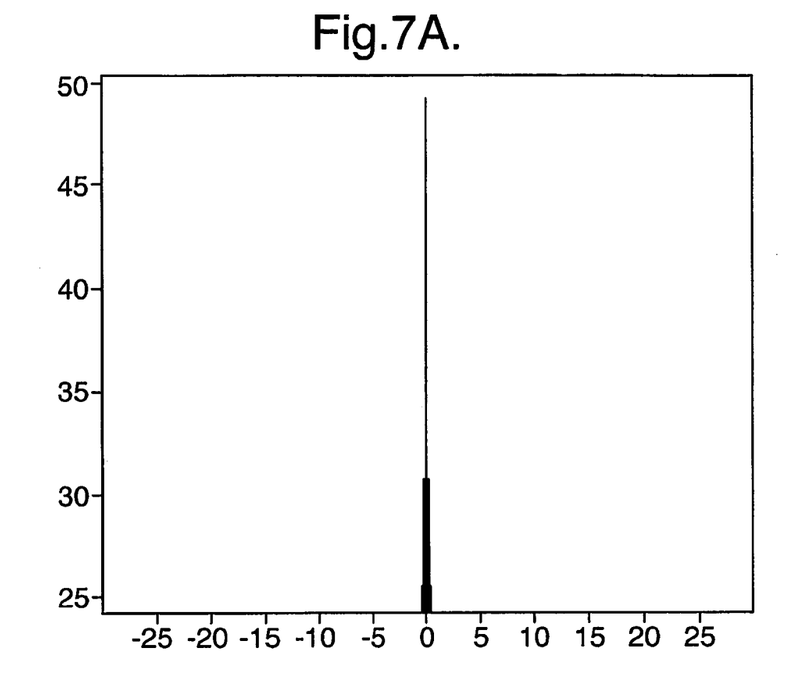
FIGS. 7A and 7B show results from the example with PRF=4000 Hz.
Figure 7B:
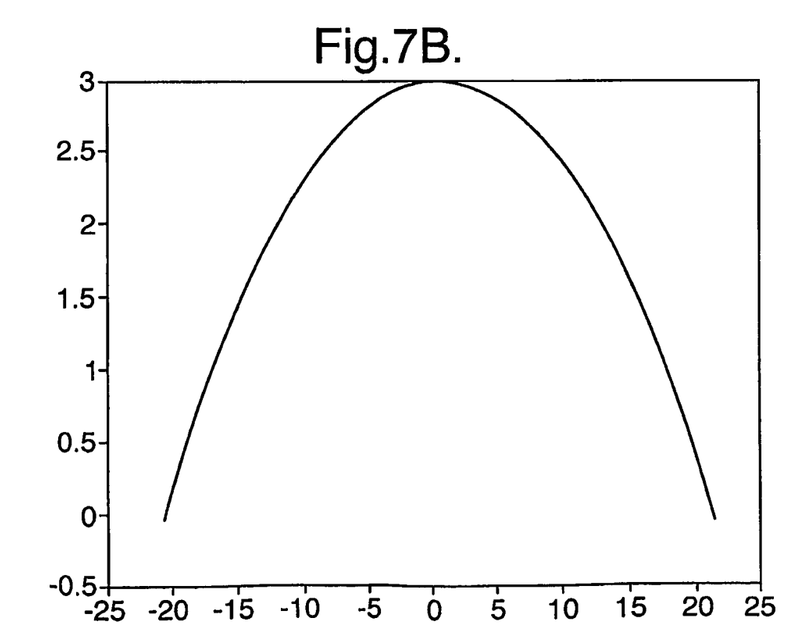
Figure 8A:
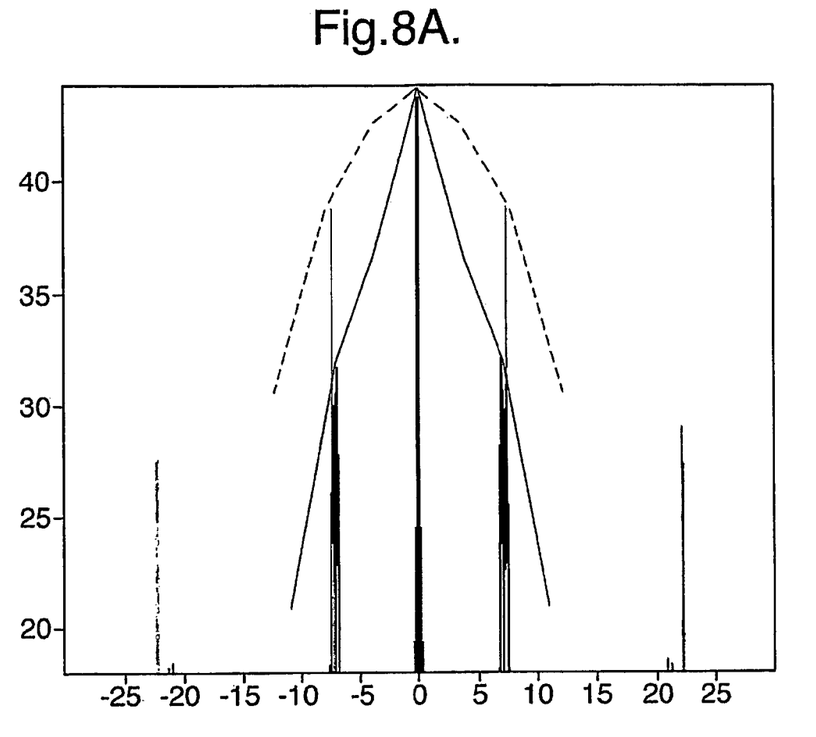
FIGS. 8A and 8B show results from the example with PRF=2000 Hz.
Figure 8B:
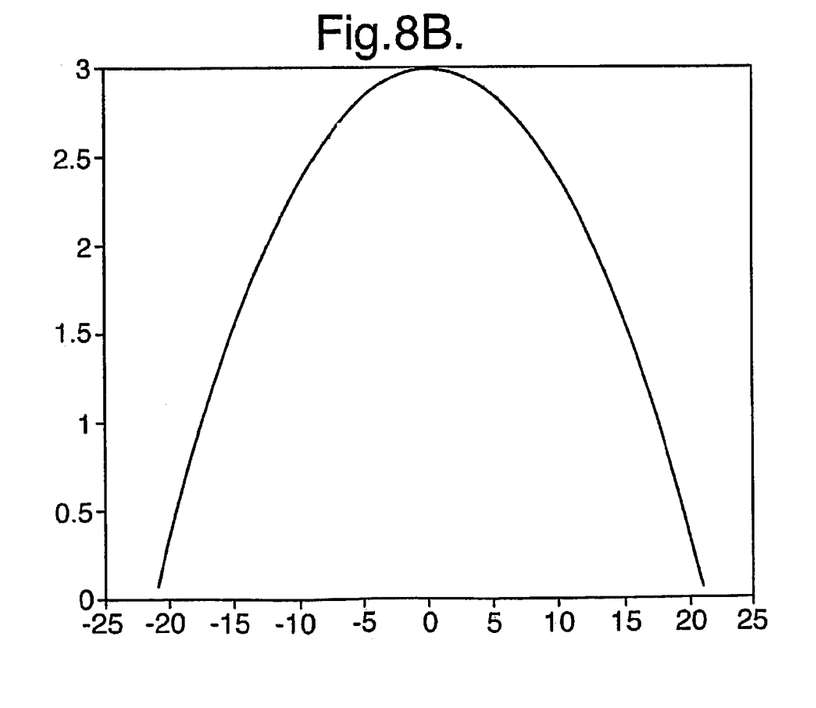
Figure 9A:
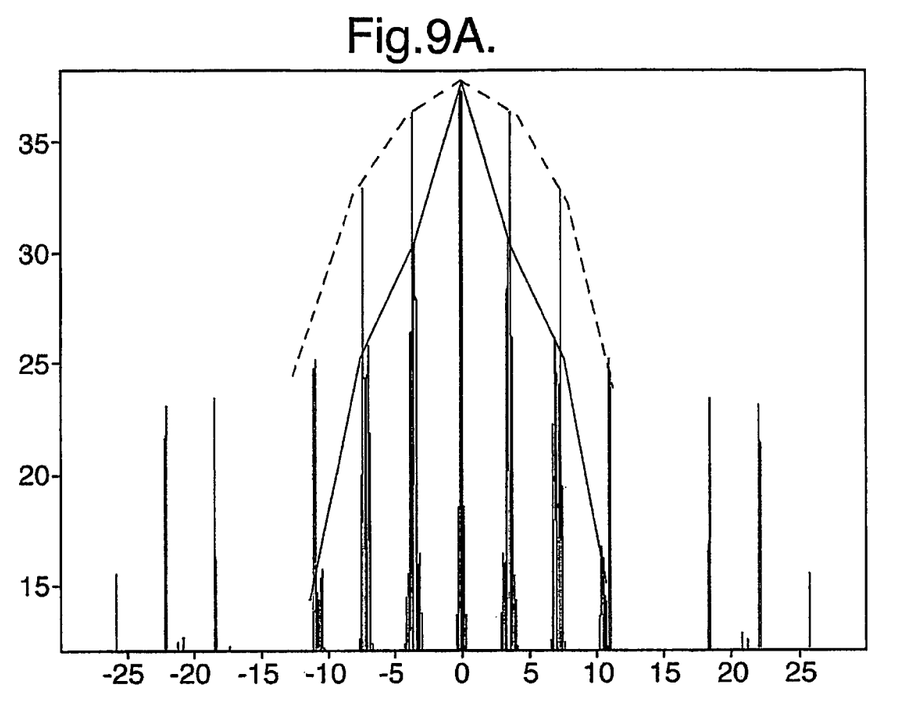
FIGS. 9A and 9B show results from the example with PRF=100 Hz.
Figure 9B:
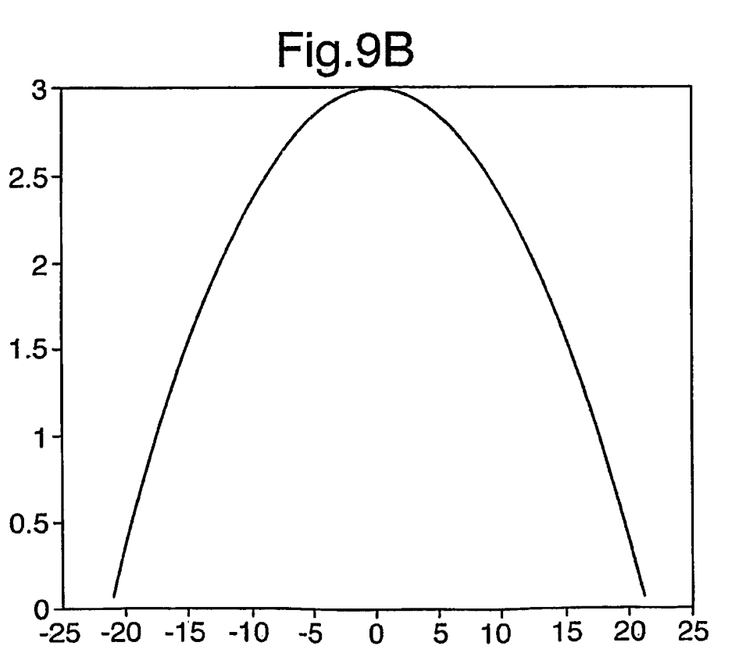
Figure 13A:
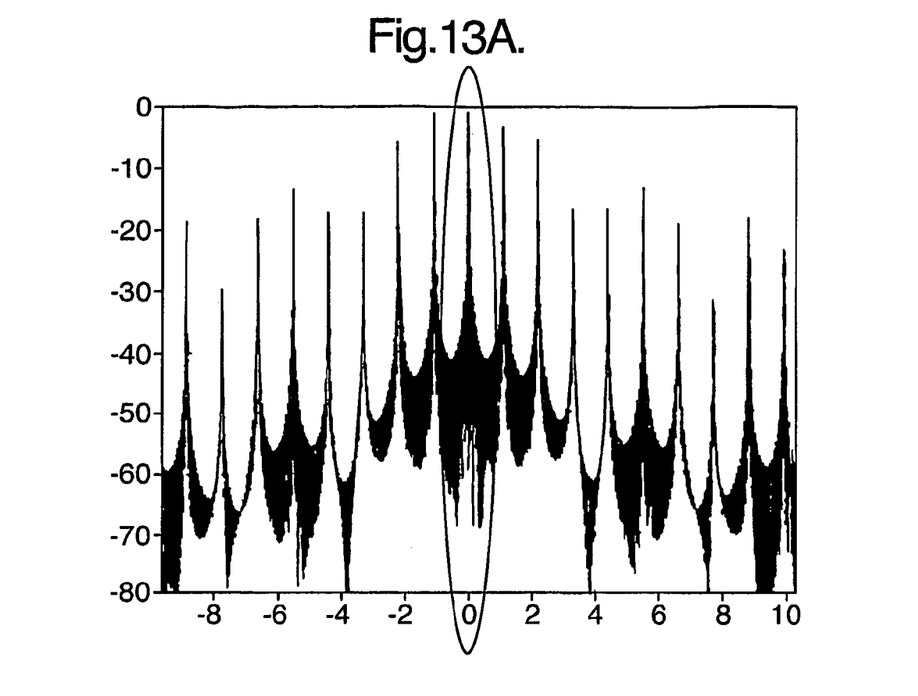
FIGS. 13A and 13B show the IRF when the radar is operating in the fixed low PRF mode according to the prior art.
Figure 13B:
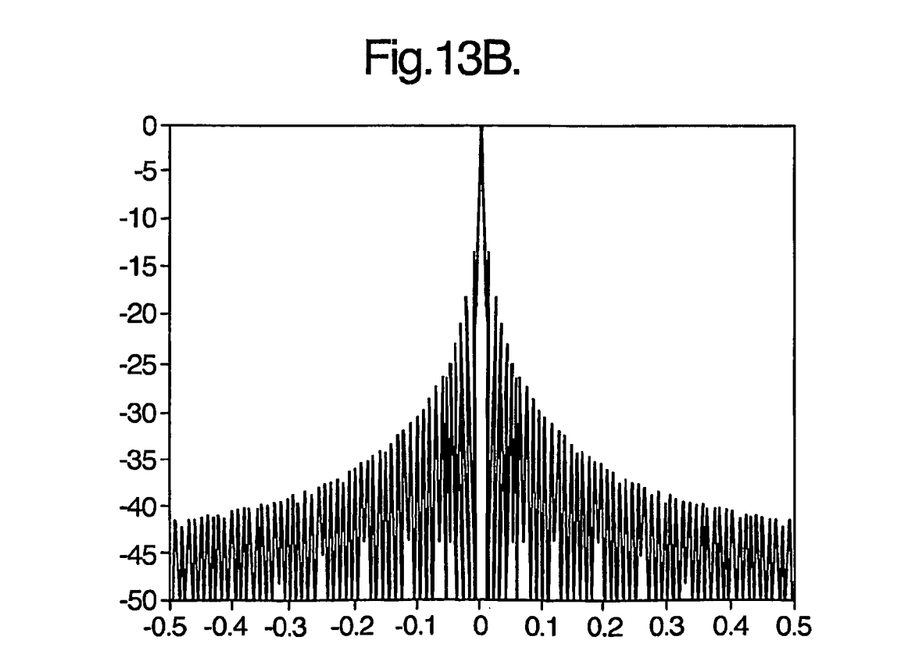

| PRF High | PRF Low | No. of Sub-PRFs |
| --- | --- | --- |
| | FIG. 6 | |
| | PRF = 7000 Hz | |
| 6603.77 | 7000.00 | 4 |
| | FIG. 7 | |
| | PRF = 4000 Hz | |
| 3773.58 | 4000.00 | 4 |
| | FIG. 8 | |
| | PRF = 2000 Hz | |
| 1886.79 | 2000.00 | 4 |
| | FIG. 9 | |
| | PRF = 1000 Hz | |
| 943.40 | 1000.00 | 4 |
| | FIG. 10 | |
| | PRF = 500 Hz | |
| 471.70 | 500.00 | 4 |
| | FIG. 11 | |
| | PRF = 200 Hz | |
| 188.68 | 200.00 | 4 |

Where the radar is operated at a fixed, low, PRF the IRF generated from the returns takes the form of a comb of intense lobes where the spacing between the lobes is inversely proportional to the PRF. The result of this condition is shown in FIG. 13.

Figure 14A:
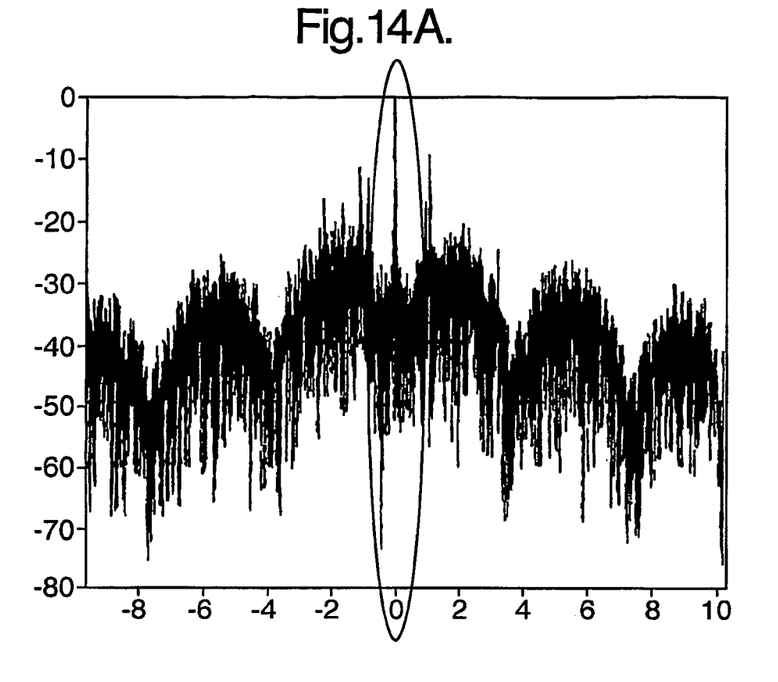
FIG. 14A and FIG. 14B show the IRF when the radar is operating with the interpulse period of the transmit-receive events changed by adding to that period a positive or negative pseudo-random delta period.
Figure 14B:
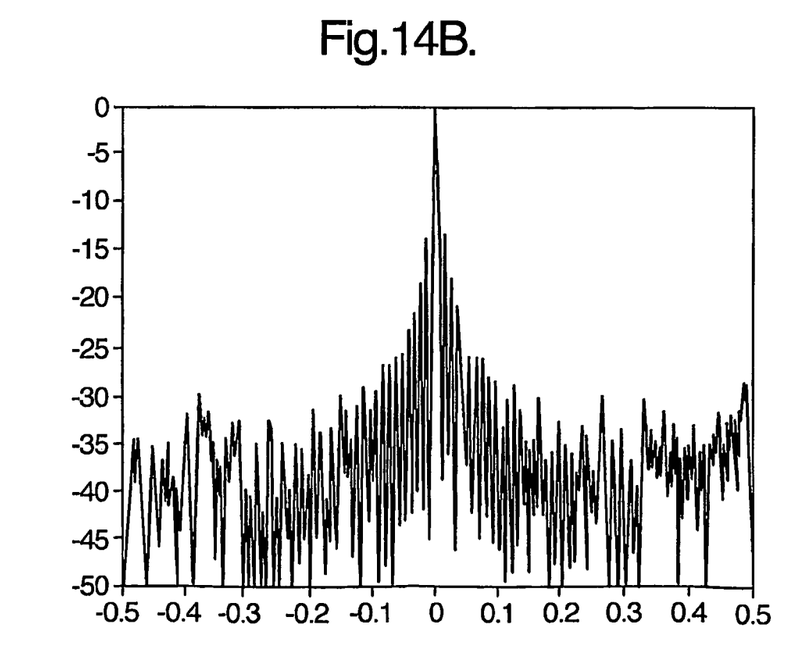

If however, the regular interpulse period of the transmit-receive events is changed by adding to that period a pseudo-random delta period that will be either positive or negative, and the echo data is processed as though acquired at a constant PRF, then the resulting IRF will be characterised by increased levels in the interlobe regions, but very rapidly decaying magnitudes for the principal lobes. Such a pattern is shown in FIG. 14.

The benefits achieved from using the pseudo randomly spaced pulses are that, firstly, targets located using this method can be localised with significantly greater precision than the fixed PRF case because there are fewer principal lobes and, secondly, the signal processing load is eased.

The invention claimed is:

1. A method of operating synthetic aperture radar in a low PRF mode, comprising:
generating a stream of radar pulses,
imposing onto said stream a predetermined modulation of the Pulse Repetition Frequency (PRF),
directing said stream to a target area, and
processing received pulses to produce an image for said received pulses, the processing comprising separating the received pulses as a sequence of sets in accordance with the predetermined modulation and superposing received radar pulses of said sets, to enhance the central received lobe and to attenuate side lobes in said image.

2. A method according to claim 1, wherein said modulation comprises providing said stream as a plurality of sets of radar pulses, each set having a PRF different from that of the other sets.

3. A method according to claim 1, wherein said modulation comprises continuously frequency modulating the PRF of said stream.

4. A method according to claim 1, wherein said modulation comprises imposing a pseudo random sequence on the PRF of said stream.

5. A method according to claim 1, wherein said target area comprises a wide swath.

6. A method according to claim 1, wherein said target area comprises a sub-swath.

7. A synthetic aperture radar for operating in a low PRF mode, comprising:
means for generating a stream of radar pulses,
means for imposing a modulation of the Pulse Repetition Frequency (PRF) of the stream of radar pulses, means for directing said stream to a target area, and a processor for processing received pulses to produce an image for said received pulses, the processor including a sorter for separating the received radar pulses into a sequence of sets in accordance with the predetermined modulation, and means for superposing received radar signals of the plurality of sets to enhance the central received lobe and to attenuate side lobes in the image.

8. Radar according to claim 7, wherein the modulation means comprises means for providing said stream as a plurality of sets of radar pulses, each set having a PRF different from that of the other sets.

9. Radar according to claim 7, wherein the modulation means comprises means for continuously frequency modulating the PRF of said stream.

10. Radar according to claim 7, wherein the modulation means comprises means for imposing a pseudo random sequence on the PRF of said stream.

11. Radar according to claim 7, wherein the radar operates in STRIPMAP mode, and said target area comprises a wide swath.

12. Radar according to claim 7, wherein the radar operates in SCANSAR mode, and said target area comprises a sub-swath.

13. A method according to claim 4, wherein said target area comprises a wide swath.

14. A method according to claim 4, wherein said target area comprises a sub-swath.

15. Radar according to claim 10, wherein the radar operates in STRIPMAP mode, and said target area comprises a wide swath.

16. Radar according to claim 10, wherein the radar operates in SCANSAR mode, and said target area comprises a sub-swath.

17. A method according to claim 1, wherein the superposing of received radar pulses of said sets comprises producing a sub-image of the target area for each set and coherently summing the sub-images.

18. Radar according to claim 7, wherein the means for superposing received radar pulses are configured to produce a sub-image of the target area for each set and coherently sum the sub-images.

19. A synthetic aperture radar for operating in a low PRF mode, comprising:
   a transmitter to generate a stream of radar pulses, impose a modulation of the Pulse Repetition Frequency (PRF) of the stream of radar pulses, and direct said stream to a target area, and
   a receiver to receive returned pulses of said stream of radar pulses and produce an image for said received pulses, the receiver comprising:
      a processor arrangement to separate the received radar pulses into a sequence of sets in accordance with the predetermined modulation and superpose received radar signals of the plurality of sets to enhance the central received lobe and to attenuate side lobes in the image.

* * * * *